Feb. 26, 1957  J. O. TAYLOR  2,782,678
COPYING CAMERA

Filed Aug. 26, 1955  10 Sheets-Sheet 1

INVENTOR
JOHN O. TAYLOR
BY
ATTORNEY

Feb. 26, 1957 J. O. TAYLOR 2,782,678
COPYING CAMERA
Filed Aug. 26, 1955 10 Sheets-Sheet 3

INVENTOR
JOHN O. TAYLOR
BY
ATTORNEY

United States Patent Office 2,782,678
Patented Feb. 26, 1957

2,782,678
COPYING CAMERA

John O. Taylor, Pleasantville, N. Y., assignor to American Type Founders, Inc., Elizabeth, N. J., a corporation of New Jersey Application August 26, 1955, Serial No. 530,814

11 Claims. (Cl. 88—24)

This invention relates to copying cameras, and more particularly to a device for photographing single or multiple copies of documents, letters, or the like, upon a continuous strip of photosensitive paper or film.

The camera of the present invention is adapted for large production photocopying work where multiple copies of a single document are to be made automatically in rapid succession and where it is desirable to economize on expensive photosensitive paper. The apparatus is particularly suitable for taking photographs of documents or letters of different sizes whereby the photosensitive paper or film is masked in accordance with the size of the copy to be reproduced, while automatic means, operating in conjunction with the masking mechanism, accurately measures each portion of the photosensitive paper that is drawn into position for a succeeding exposure.

Provision is also made in the present machine to score the photosensitive paper at the boundary of each copy with a perforated line so that single copies or several copies in succession may be torn off as desired and distributed in groups of one, two, three, or more, as the occasion requires.

The scoring mechanism is also adapted to sever the photosensitive paper completely at the end of the run of photocopies of one or more documents. Here also, after the paper has been completely severed, a novel mechanism is provided to draw the lead end from the reel of unexposed photosensitive paper to a point at the edge of the mask so that the next photograph is taken without any waste of photosensitive paper.

After a run of photocopies has been made, and that section of the photosensitive paper has been severed completely from the reel, the cutoff operation is arranged to actuate the mechanism for feeding the lead edge of the exposed paper into the developing bath placed at the rear of the device.

Still other objects and advantages of the invention will be apparent from the specification.

The features of novelty which I believe to be characteristic of my invention are set forth herein and will best be understood, both as to their fundamental principles and as to their particular embodiments, by reference to the specification and accompanying drawings, in which.

Figure 1:
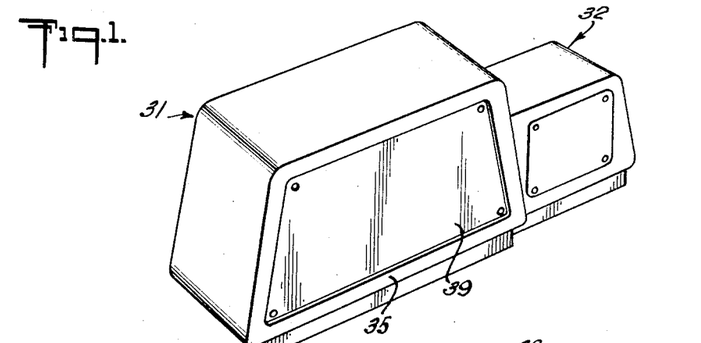
Figure 1 is a front perspective view of one side of the copying camera and developing tank of the present invention showing its general configuration.

Referring to the drawings in detail, there is shown in Fig. 1 the photographic apparatus which is divided into two portions; namely, a camera, generally designated 31; and a developing tank, generally designated 32. Camera 31, mounted upon a suitable base, comprises a floor 33, side wall 34, side wall 35, front wall 36, rear wall 37, and top panel 38. The wall has a removable panel 39 permitting access to the operating mechanisms on the interior of the camera.

Figure 5:
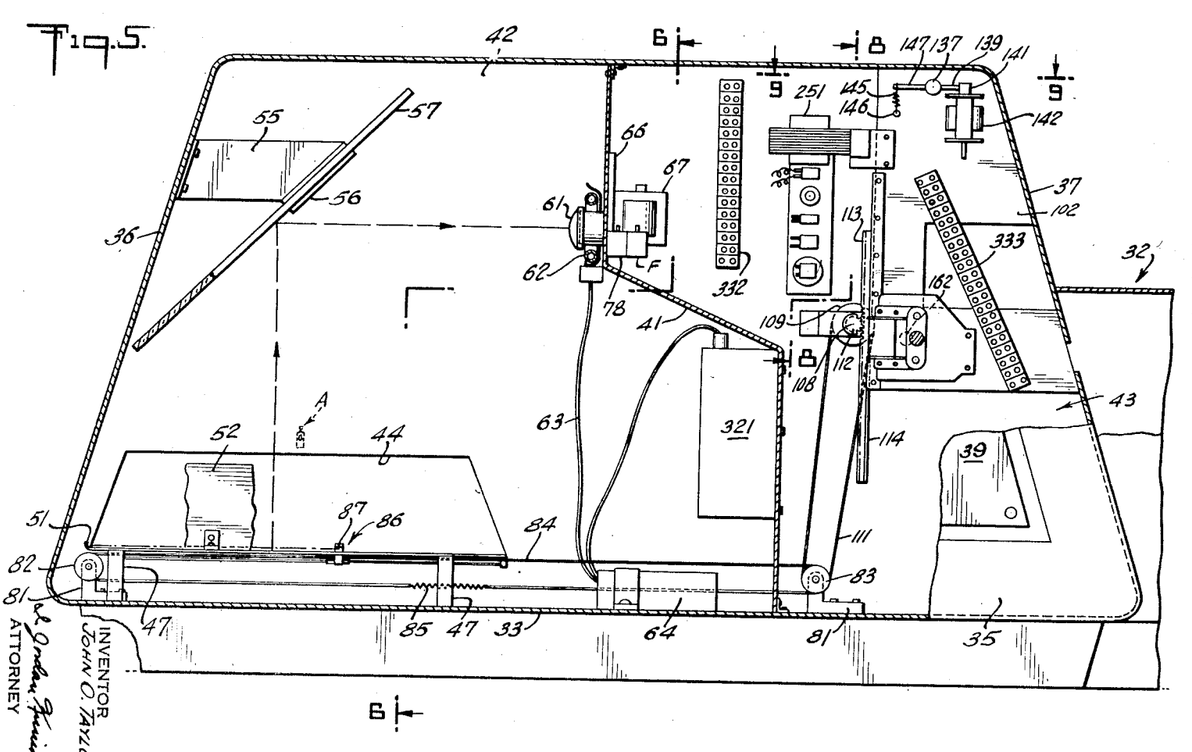
Fig. 5 is a greatly enlarged view, party in cross-section and partly in elevation (looking in the same direction as Fig. 1), and taken on line 5—5 of Fig. 6, looking at the interior of the device, showing its various component parts.

The interior of camera 31 is divided by means of panel 41 into a light chamber 42 and a dark chamber 43. See Fig. 5. Wall 34 has an elongated horizontal aperture 44 through which is inserted the copy that is to be photographed. Mounted on floor 33 of chamber 42 are several brackets 47 which support table 48 upon which is placed copy 49 in the form of letters, documents, or other printed or written material. See Figs. 5 and 6. Table 48 is turned up at one end in the form of a stop 51 against which one edge of the copy sheet 49 may be aligned for measurement purposes. Connected along the longitudinal edge of table 48 near wall 35 is an upwardly extending light reflector 52 which also serves as a stop against which copy 49 may be aligned.

Connected to the upper portion of wall 36 is bracket 55 which extends inwardly into chamber 42 (Fig. 5) and terminates in a pair of laterally extending arms 56 which support between them a mirror 57 arranged at substantially a 45° angle relative to table 48.

Mounted upon the upper vertical portion of partition 41 is lens 61 whose optical axis is oriented in a substantially horizontal plane toward mirror 57, said lens being arranged to view an image in the mirror of copy 49 positioned upon table 48. Positioned on a suitable support bracket attached to partition 41 is a stroboscopic light 62 in the form of a circular tube surrounding lens 61. Stroboscopic light 62 is adapted to produce a flash of light in chamber 42 to illuminate copy 49, the image of which is reflected by mirror 57 and is transmitted through lens 61 into dark chamber 43 where the photographing process takes place. Stroboscopic light 62 derives its power by way of lead line 63 connected to a suitable power transformer 64.

Mounted on the dark chamber side of panel 41 is shutter box 66 suitably aligned with lens 61. The diaphragm in shutter box 66 is actuated by means of solenoid 67, mounted on panel 41. See Figs. 5 and 6. Connected to vertically movable core 68 of solenoid 67 is bar 69 engaging one end of lever 71, pivotably rotatable about pin 72. Mounted on the other end of lever 71 is pin 72 which extends through and is movable along arcuate slot 74 in shutter box 66. By means of conventional mechanisms (not shown), the motion of pin 73 causes diaphragm in box 66 to open or close as the circumstances require. The upward motion of core 68 causes lever 71 to open the diaphragm of the shutter.

Figure 6:
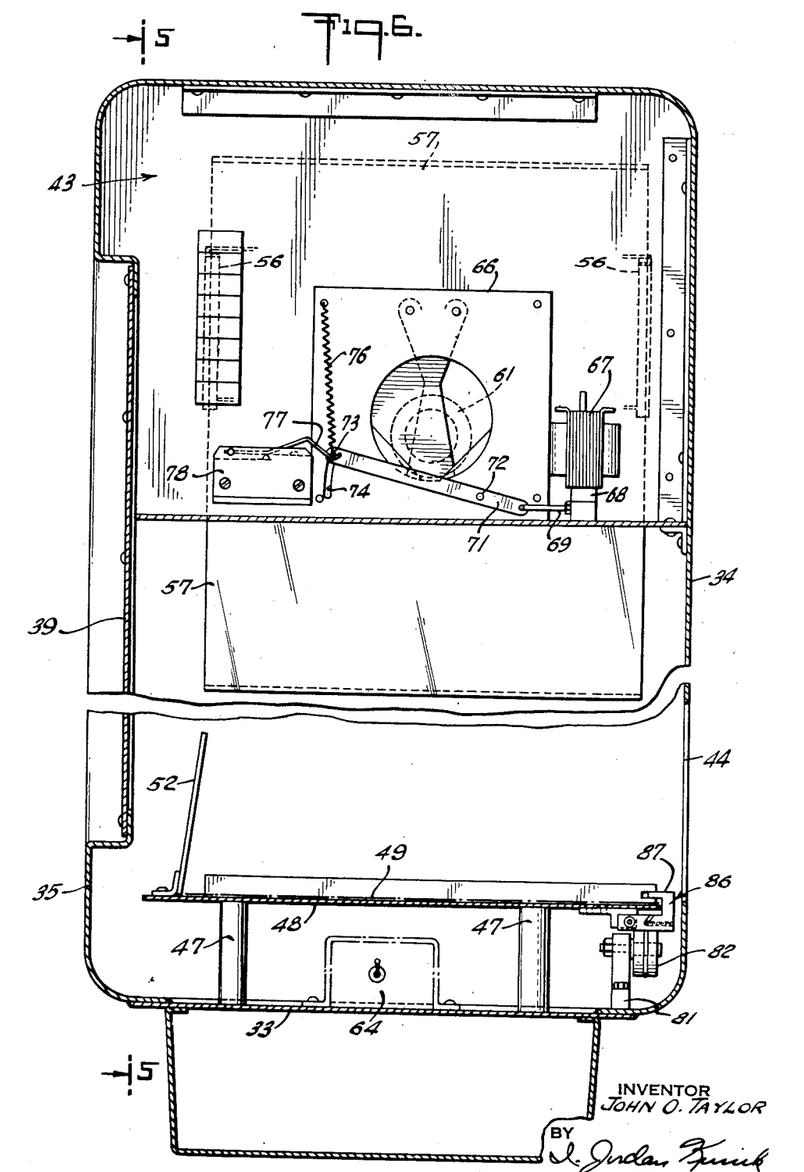
Fig. 6 is a still further enlarged section view taken on line 6—6 of Fig. 5, looking at the rear of the shutter mechanism.

Pin 73 is also engaged by one end of upwardly extending spring 76, the other end of which is connected to shutter box 66. Spring 76 normally returns lever 71 to its original position as shown in Fig. 6, after it has been operated by solenoid 67. When lever 71 is rotated to open the diaphragm of the shutter, pin 73 is arranged to engage switch arm 77 of microswitch 78 electrically connected to stroboscopic light 62, causing the latter to glow instantaneously while the diaphragm is open, after which lever 71 returns to its original position under the action of spring 76, and closes the diaphragm.

The apparatus herein is adapted, in one embodiment, to make a reproduction of reduced dimensions relative to the size of copy 49. This is accomplished by providing a manually operated measuring and masking system that automatically frames the photosensitive film with the desired dimensions in accordance with a predetermined proportional relationship with the size of original copy 49. This mechanism comprises brackets 81 secured to floor 33 and rotatably supporting pulleys 82 and 83, respectively, of substantially equal diameter. See Figs. 2, 3, 5 and 6.

Mounted with a suitable amount of tension around pulleys 82 and 83 is a cord 84, the longitudinal motion of which causes both of said pulleys to rotate. The tension of cord 84 may be enhanced by means of a section of spring 85 connected in the line of the cord. Connected to cord 84 is a U-shaped indicator, generally designated 86, having pointer arm 87 and leg 88, the latter being provided with an inclined slot 89 adapted to receive the cord, which may be secured in position by means of screw 91. See Fig. 4.

The shaft of pulley 83 extends through panel 34 and terminates in knob 83a (Figs. 2 and 3) which is manually rotatable whereby indicator 86 is caused to move longitudinally. The longitudinal movement of indicator 86 may be stabilized by means of an elongated bushing 92 slidably mounted over rod 93, the ends of which are mounted in brackets 94, connected to the underside of the edge of table 48.

Figures 14, 15:
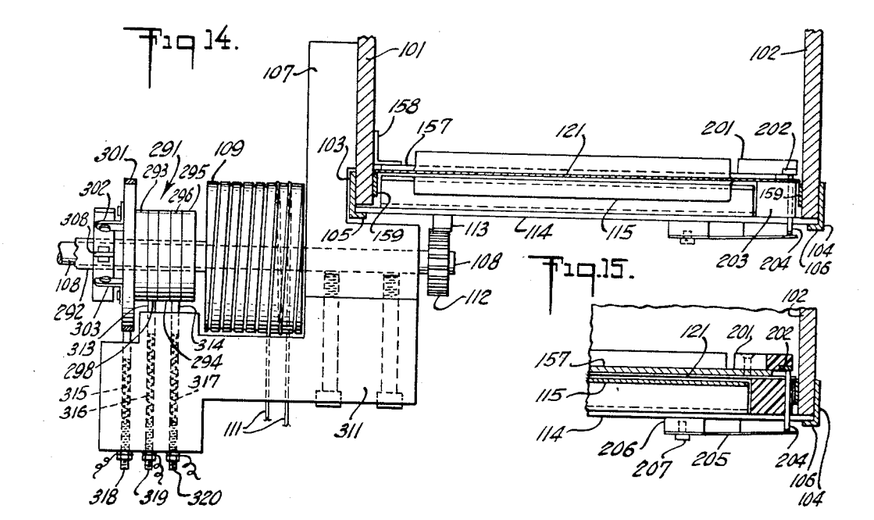
Fig. 14 is a plan section view, taken along line 14—14 of Fig. 8, and showing a portion of the control mechanism for the lower movable mask.
Fig. 15 is a fragmental plan section of a detail of the electrical contact strip.
Figure 16:
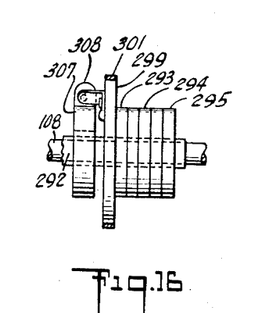
Fig. 16 is a detail in elevation, partly in cross-section, of the contact discs shown in Fig. 14.

Suspended from top panel 38 and extending downwardly into dark chamber 43 is a pair of parallel panels 101 and 102, to the sides of which are attached vertical brackets 103 and 104, having right angle flanges 105 and 106, respectively, spaced slightly apart from the forward edges of said panels. See Fig. 14. Attached to panel 101 is a bracket 107 which rotatably supports a shaft 108 on which is mounted pulley 109. Pulley 109 is rotated by means of cord 111 which encircles pulley 83.

Mounted on one end of shaft 108 is pinion 112, the peripheral teeth of which engage the teeth of a vertical rack 113 connected to masking plate 114 which is movable vertically between brackets 103 and 104. The relative diameters of pulley 109 and pinion 112 are arranged to provide for the requisite differential between the size of the original copy 49 and that of the final photocopy. Mounted along the top of masking plate 114 is a curved paper guide 115 whose upper edge defines the dimensions of the film to be exposed. In other words, assuming that the camera herein is intended to produce reduced reproductions of copy 49 on table 48, the fractional reduction is predetermined by the relative diameters of pulley 109 and pinion 112. It is apparent that this dimensional relationship between pulley 109 and pinion 112 may be reversed in order to produce enlarged reproductions of the copy, if such are required, and provided the other parts of the machine are accommodated for such purpose.

Figure 7:
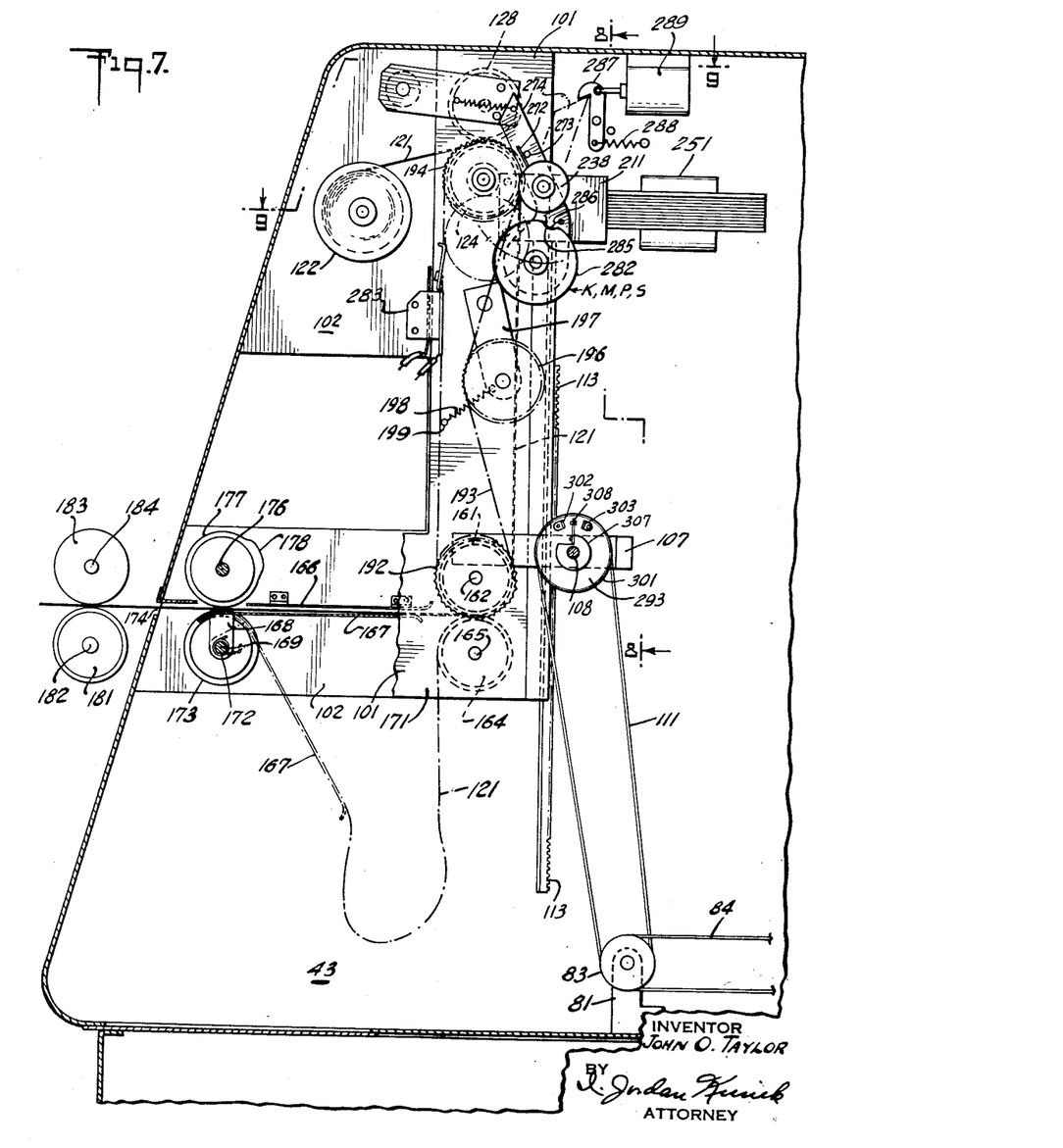
Fig. 7 is a secondary view of the rear portion of the camera shown in Fig. 2, said section being taken on line 7—7 of Fig. 8, and showing in greater detail the photosensitive paper transport mechanism.

Photosensitive film 121 is supplied from a reel 122 rotatably mounted on shaft 123 secured horizontally between the walls 34 and 35 in dark chamber 43 (Fig. 7). Film 121 passes over feed rolls 124 and 125 mounted rotatably on shaft 126, connected between panels 101 and 102.

A pair of pressure rolls 128 and 129 are arranged to rest on top of film 121 directly above feed rolls 122 and 123, respectively, said pressure rolls being rotatably mounted on shaft 131 supported by bracket 132. See Figs. 7, 8 and 9. Bracket 132 is attached to one end of arm 133, the other end of which is attached to sleeve 134 mounted around shaft 135 and secured thereto by set screws 136.

Figures 3, 4:
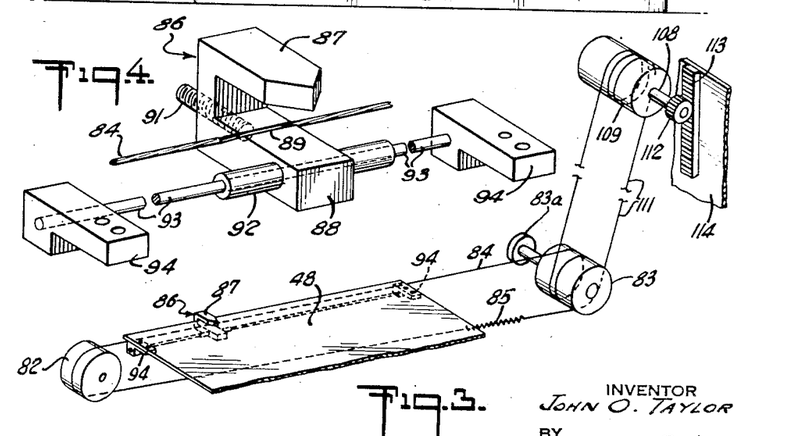
Fig. 3 is an enlarged schematic view in perspective of the photograph adjustment mechanism shown in phantom outline in Fig. 2.
Fig. 4 is a still further enlarged detail view of the travelling pointer shown in Fig. 3.
Figure 8:
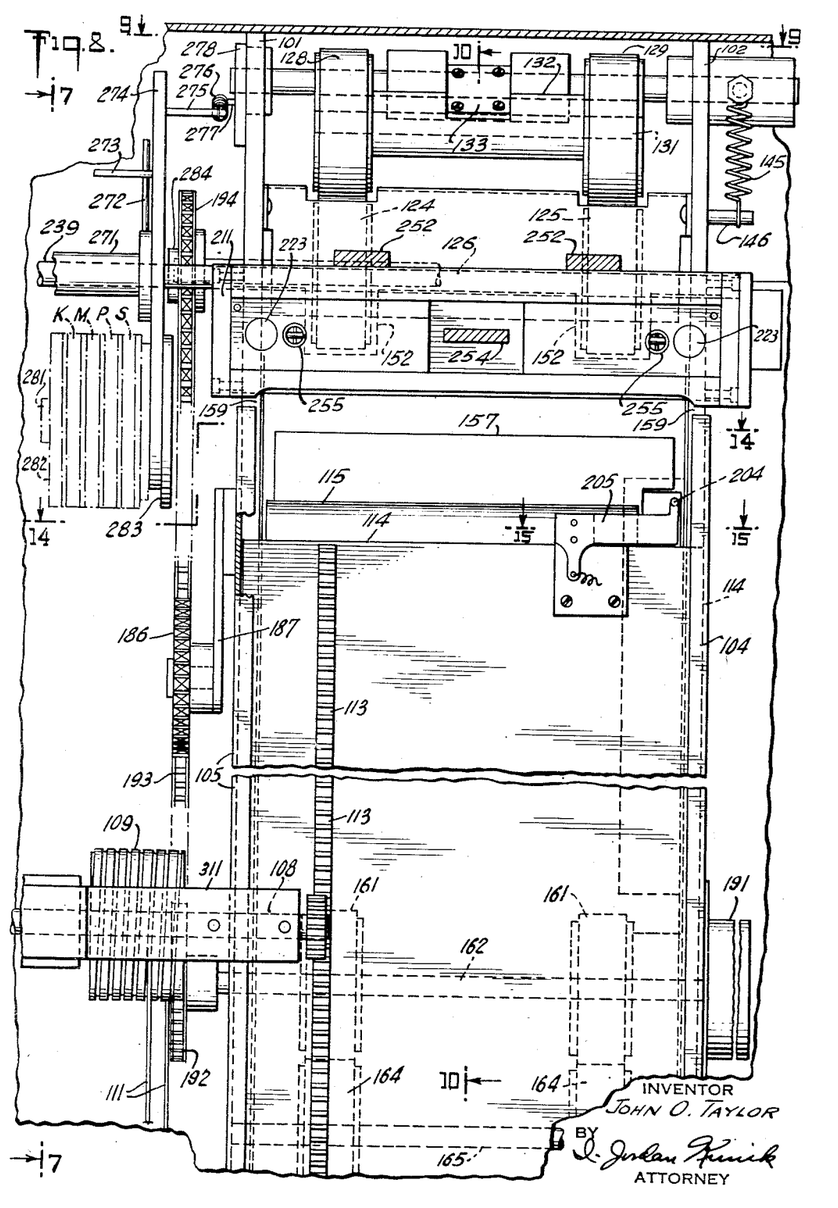
Fig. 8 is a greatly enlarged elevation view taken on line 8—8 of Fig. 7, some parts being in section, the view being taken toward the rear of the camera.
Figure 9:
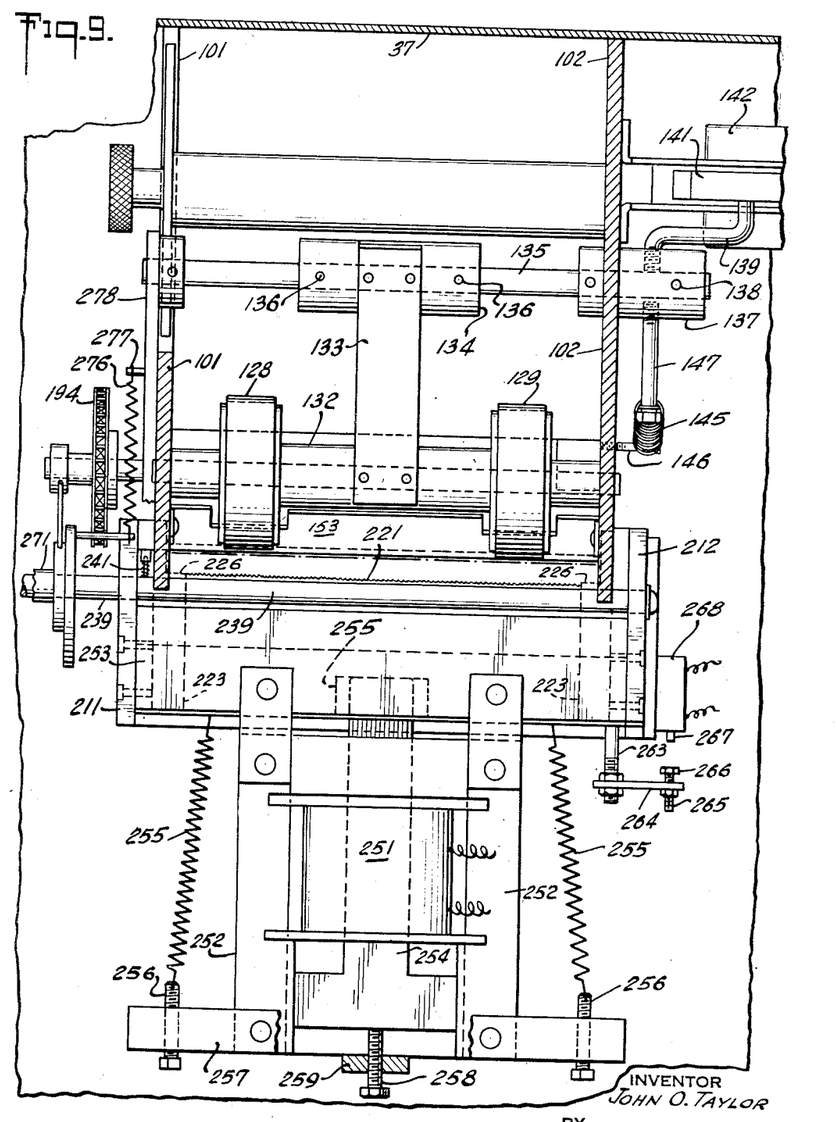
Fig. 9 is a top plan view of the mechanism shown in Fig. 8, taken on line 9—9 of Fig. 7.

Shaft 135 is rotatably supported between suitable bearings mounted on panels 101 and 102. Mounted on one end of shaft 135 extending through panel 102 is sleeve 137 secured thereto by set screw 138. Figs. 4, 8, 9. Connected to one side of sleeve 137 is one end of bar 139, the other end of which is attached to core 141 of solenoid 142 mounted by means of suitable brackets to panel 102. The actuation of solenoid 142 causes core 141 to move downwardly causing shaft 135 to rotate and lift pressure rolls 128 and 129.

Pressure rolls 128 and 129 are normally urged downward against feed rolls 124 and 125, respectively, by means of spring 145, one end of which is anchored to pin 146 on panel 102, and the other end being connected to bar 147 secured in sleeve 137. When pressure rolls 128 and 129 are being urged downwardly and are bearing on film 121, they permit feed rolls 124 and 125, which are power actuated as will be explained below, to cause the film to be drawn from reel 122 and to pass into exposure position.

While rolls 124 and 125 normally rotate continuously to feed the film toward the exposure area, the film traverse must periodically be interrupted in order to expose, perforate and/or cut the film. This is accomplished by actuating solenoid 142 to lift pressure rolls 128 and 129 which release their grip upon the film, whereupon the film feed stops, the surface of feed rolls 124 and 125 merely slipping freely underneath the film. Film feed is resumed by the deactivation of solenoid 142 permitting spring 145 to cause pressure rolls 128 and 129 under the action of spring 145, to bear down upon rotating feed rolls 124 and 125, respectively, to grip the film and cause it to be drawn again from its supply reel.

Figures 10, 11, 12, 13:
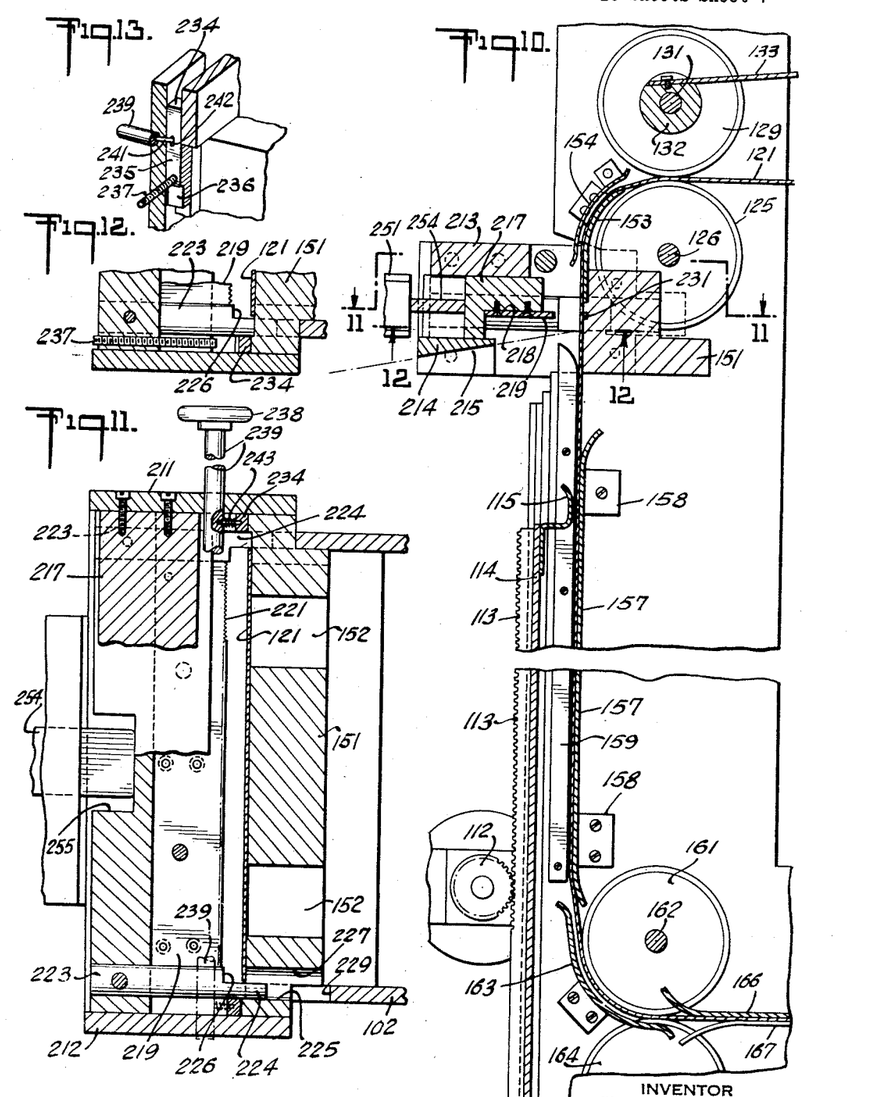
Fig. 10 is a vertical cross-section showing the die and perforating blade mechanism, and taken on line 10—10 of Fig. 8.
Fig. 11 is a horizontal cross-section showing more clearly the component parts of the die and perforating blade construction, taken on line 11—11 of Fig. 10.
Fig. 12 is an inverted fragmental cross-section of the punch, die and stop, taken on line 12—12 of Fig. 10.
Fig. 13 is a fragmental perspective of some component parts shown in Fig. 11.

Connected to and extending transversely across panels 101 and 102 is a block 151 which has recesses 152 permitting the free rotation of rolls 124 and 125. Figs. 8 and 10. Connected to block 151 is an upwardly extending curved paper guide 153, the upper edge of which curves toward the top of rolls 124 and 125. Connected between panels 101 and 102 is a second paper guide 154 spaced slightly apart from guide 153. The upper edge of guide 154 is positioned to catch the lead edge of film 121, and cause it to pass in a downward path over guide 153.

Film 121 proceeds downward and slides along guide plate 157, mounted by brackets 158, connected to vertical panels 101 and 102. See Figs. 10 and 14. Vertical alignment for film 121 is provided by means of a pair of vertically extending guides 159 connected to panels 101 and 102. Film 121 then passes downwardly and around a pair of rolls 161 rotatably mounted around shaft 162 and extending through panels 101 and 102. See Figs. 8 and 10. Film 121 is fed toward rolls 161 by means of curved guide 163, attached to panels 101 and 102.

Film 121 is urged against the periphery of rolls 161 by the peripheries of a pair of idler rolls 164 rotating around shaft 165 mounted in panels 101 and 102. After emerging from rolls 161 and 164, film 121 may pass between the outwardly extending flanges of guide plates 166 and 167 forming a path for the film extending to the rear of camera 31. Guide plate 165 is supported horizontally by means of suitable brackets connected to panels 101 and 102.

Plate 167 is supported by means of a pair of spaced apart downwardly extending lugs 168, one of which is seen in Fig. 7. Said lugs are rotatably mounted around horizontal shaft 169 supported between rearwardly extending legs 171 of panels 101 and 102. Coiled around shaft 169 is a spring 172, one end of which extends outward from said shaft and is normally urged upward against the bottom of plate 167.

Mounted rotatably around each end of shaft 169 beyond the outer edges of plate 167 are rolls 173 over which film 121 moves toward exit 174 in the rear of the camera.

Positioned directly above shaft 169 is a second shaft 176 mounted between extensions 171 of panels 101 and 102, said shaft rotatably supporting a lock wheel 177 having a locking cam 178. Shaft 176 extends through leg 171 and through wall 34 of the camera, and is terminated by knob 179 (Fig. 2), which may be manually operated to cause locking cam 178 to wedge film 121 between itself and roll 173. When this is done, film 121 that is being exposed and fed by drive rolls 161, is prevented from passing beyond rolls 173 and 177, and as the film accumulates, plate 167 lowers against the action of spring 172 and the film collects in the bottom of the dark chamber 43 of the camera.

After a sequence of exposures has been made and collected in the bottom of dark chamber 43, and the film has been severed from the supply reel, knob 179 may be rotated in the reverse direction permitting the rearward movement of film 121 through exit 174 into the developing tank 32. The transit of film 121 may be arranged by means of a pair of drive rolls 181 rotatably mounted on a motor driven shaft 182, pressure upon film 121 being provided by a pair of idler rolls 183 rotating around shaft 184 and urged downwardly by suitable means. See Fig. 7.

Mounted on one end of shaft 162 (Fig. 8) is a motor 191 which serves as the power drive for feeding the film and for running the sequencing mechanism to be described below. Connected to the other end of shaft 162 is a sprocket wheel 192 which is engaged by chain 193 which engages and drives sprocket wheel 194 mounted fast on shaft 126. See Figs. 7 and 8. Tension is applied to chain 193 by means of idler sprocket wheel 196 rotatably mounted on bracket 197, pivotally connected to panel 102. Idler wheel 196 is urged against chain 193 by means of spring 198 connected between bracket 197, and a suitable pin 199, or the like, mounted on panel 101. By these means, drive rolls 161 and driven rolls 124 and 125 provides for the advancement of film 121 from the top to the bottom of the camera.

Mounted vertically on guide 157 (Figs. 14, 15) is an elongated block 201 of insulating material along the edge of which is inlaid an electrically conductive contact strip 202 extending slightly beyond the edge of guide 157. Mounted on masking plate 114 is a block 203 of insulating material having an aperture through which there movably extends an electrically conductive pin 204, one end of which is adapted to make contact with strip 202. The other end of pin 204 is engaged by an electrically conductive spring 205 connected to an insulating bracket 206 mounted on masking plate 114 by means of terminal screw post 207 to which a suitable lead line may be connected. Spring 205 normally urges pin 204 toward contact strip 202 which is located slightly above the level of the top edge of paper guide 115, and when there is nothing interposed between the pin and the strip, an electrical circuit is closed, the function of which will be described below.

When film 121 passes between pin 204 and strip 202, the circuit controlled by said contact is broken and consequently it is non-operative. In accordance with procedures that will be described hereinbelow, film 121 is intermittently provided with notches 211 (Figs. 19, 20, 21) during its traverse from the supply reel down toward the area in which it is exposed. As the right hand notches reach pin 204, the latter is permitted to close against electrically conductive strip 202 to close an electrical circuit, the function of which will be described hereinbelow.

Attached to panels 101 and 102 is a pair of rearwardly extending brackets 211 and 212, respectively (Figs. 7, 9), between which are connected a pair of spaced apart horizontal blocks 213 and 214. The lower portion of block 214 is undercut to provide a sloping surface 215 whereby light emerging from lens 61 may impinge upon the upper portion of film 121 (see Fig. 10). Thus slope 215 serves as the upper limit of the light rays impinging upon film 121, thereby forming the upper masking limit for the exposure, while the upper edge of film guide 151 serves as the lower masking limit for the exposure.

Movable horizontally between blocks 213 and 214 is a knife block 217 which is undercut to form a horizontal surface 218 to which is attached cutting knife 219 having a serrated edge 221.

Connected to both sides of block 217 is a pair of round punch rods 223 having forward ends which terminate in semi-circular pilots 224 which are adapted to mate longitudinally with guides 225 in block 151. See Figs. 11 and 12. The portion of punch rods 223 that extend laterally from pilots 224 serve as semi-circular punches 226 which are adapted to mate with dies 227 in block 151.

Figures 19, 20, 21:
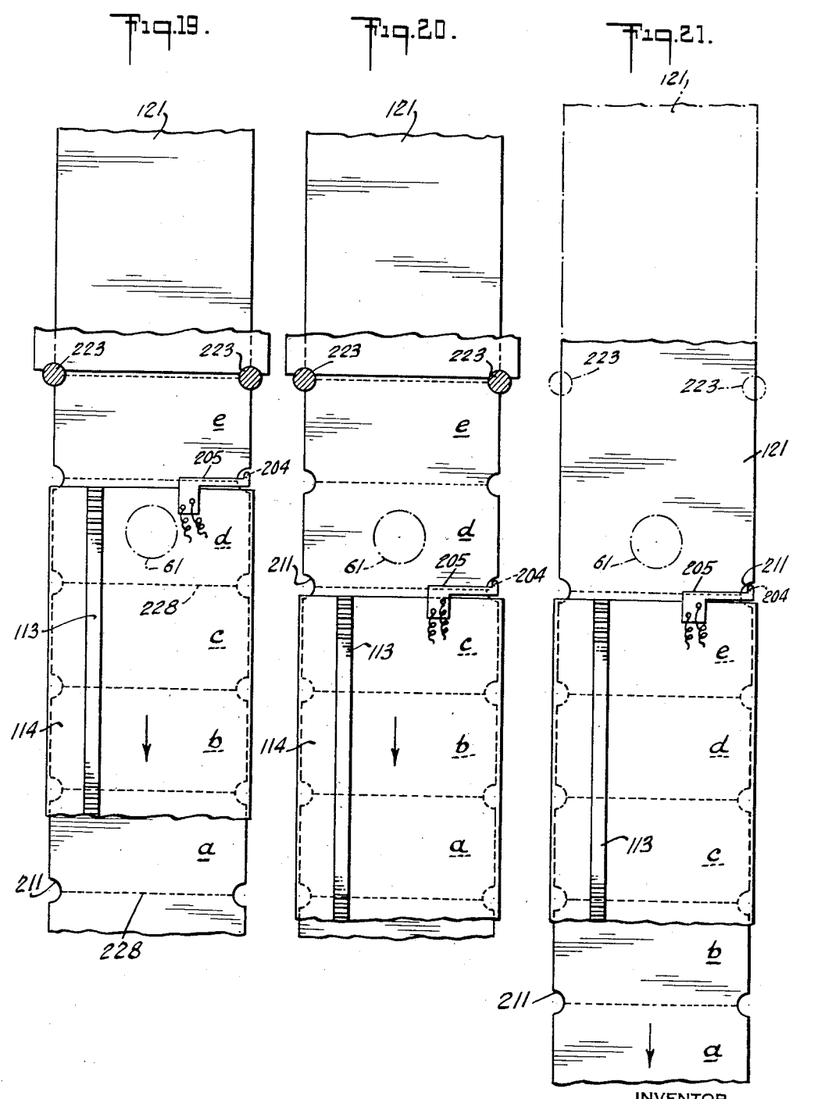
Fig. 19 is a diagrammatic face view of the photosensitive paper, with the mask set for one typical operative condition.
Fig. 20 is similar to Fig. 19, with the mask lowered to a new position in preparation for taking a larger exposure for a succeeding run of pictures.
Fig. 21 is similar to Fig. 20 but indicates that the photosensitive paper, as shown in Fig. 20, has moved downward, and exposed a fresh run thereof within a larger frame.

When block 217 is moved forward toward film 121, the serrated edge 221 of knife 219 is adapted to produce a perforation 228 in the film 121 (Figs. 19, 20, 21), provided the forward motion of block 217 is limited by a mechanism to be described hereinbelow. At the same time punches 226, whose cutting edges are positioned in advance of serrated edge 221 of knife 219, enter dies 226 and cut semi-circular notches 211 in film 121. Figs. 19 through 21. Chips of the cutout notches are permitted to fall out of dies 227 by way of apertures 229 in panels 101 and 102.

When block 217 is permitted to move forward further than the perforating limit, serrated edge 221 of knife 219 enters into a mating slot 231 in block 151 (Fig. 10), thereby completely severing the exposed film 121 from its supply reel.

In order to differentiate the perforating and the cutting action of knife blade 219, there is provided a pair of stop bars 234, movable vertically against cooperating edges of block 151 (see Figs. 11, 12, 13). Each bar 234 has two abutment surfaces, 235 and 236, which serve as limiting stops for the free ends of a pair of screws 237, threadably mounted in block 217.

Bars 234 are adapted to be moved manually from one position to another by means of knob 238 outside the cabinet (Figs. 2 and 11), the shaft 239 of which extends through wall 34 and is rotatably supported between suitable apertures in brackets 211 and 212. Connected to shaft 239 are a pair of pins 241 which engage suitable apertures 242 in bars 234 whereby the rotation of shaft 239 causes the said bars to move in either direction.

Springs 243 coiled around each pin 241 (see Figs. 9 and 11), normally urge bars 234 downward whereby stop surfaces 235 are abutted by the ends of screws 237 (Fig. 13). Thus, the forward movement of knife blade 219 will be limited, and its serrations 221 will merely score film 121 and provide it with a horizontal perforation 228 extending between notches 211.

Perforations 228 in film 121 are made when multiple photocopies are to be made, after which it is desired to cut the sequence off from the supply reel, in which case knob 238 is rotated manually, causing shaft 239 to move bars 234 upward to a position where the ends of screws 237 abut stop surface 236 of said bars, whereby knife 219 is permitted to move a greater distance to mate with slot 231 so that film 121 is completely severed.

The action for moving block 217 and cutting knife 219 therewith, is provided by a solenoid 251 mounted between brackets 252 connected to cross bar 253 mounted between brackets 211 and 212 (Fig. 9). Solenoid 251 has a core 254 whose forward end is accommodated by recess 255 in block 217. The energization of solenoid 251 causes core 254 to move block 217 and knife 219 toward film 121.

Knife 219 is normally maintained retracted from film 121 by means of springs 255, one end of each of which is connected to block 217, the other ends being connected to screws 256 threadably inserted in bar 257 mounted across brackets 252. Screws 256 are adapted to adjust the tension of springs 255. The return motion of core 254 of solenoid 251 is adjustably limited by the end of screw 258 threadably inserted through bar 259 mounted on suitable means (not shown) between brackets 252.

Mounted on the rear portion of block 217 is a bracket 263 having a laterally extending arm 264 at the end of which is mounted a screw 265, the head 266 of which is adapted to engage contact arm 267 of microswitch 268. Screw 265, which moves with block 217 during the perforating or cutting action of knife 219, may be adjusted to impinge upon contact arm 267 at the appropriate time to provide the next succeeding circuit operation controlled by switch 265, as will be described hereinbelow.

Mounted coaxially around shaft 239 and rotating therewith, is a sleeve 271 (Fig. 8), to which is connected an arm 272 adapted to engage pin 273 attached to bell crank 274 which is pivotable about shaft 239. The upper end of bell crank 274 has a pin 275 to which is connected one end of spring 276, the other end of which is connected to pin 277, mounted on bracket 278 attached to panel 101.

The lower portion of bell crank 274 has a shaft 281 which rotatably supports sequencing drum 282 on the periphery of which are mounted a plurality of parallel cams K, M, P, and S. When bell crank 274 is rotated against the action of spring 276, cams K, M, P and S are permitted to depress corresponding contact arms $k$, $m$, $p$ and $s$ (Fig. 7) of a bank 283 of control switches connected by a suitable bracket to panel 101. In Fig. 7, the profile view shows only one switch, but it is understood that the number of switches correspond to the number of cams on drum 282.

The means for rotating sequencing drum 282 comprise a resilient ring 283, of rubber or the like, mounted fast on shaft 281, whose periphery, when bell crank 274 is rotated around shaft 239, is engaged frictionally by the periphery of resilient ring 284 mounted fast upon and rotating with drive shaft 126. The length of time each of the switches in bank 283 is actuated is dependent upon the length of the corresponding cams, K, M, P and S on drum 282, the sequencing operation of which will be described hereinbelow.

Drum 282 has an indentation 285 at its periphery near bell crank 274, said indentation being engageable by a spring detent 286 attached to bell crank 274, whereby a slight additional movement is imparted to drum 282 after it stops rotating in order to bring said drum to a home position in preparation for another cycle of operation.

When knob 238 is rotated clockwise, causing arm 272 to engage pin 273, bell crank 274 is also rotated clockwise to cause rings 285 and 286 to engage whereby cams on drum 282 rotate and engage their respective switches on bank 283. In its operative position, the upper end of bell crank 274 is engaged by pawl lock 287 pivotally mounted on a suitable pivot pin connected to panel 101. Locking engagement for pawl 287 is provided by a spring 288, one end of which is connected to the lower end of pawl 287, and the other end of which is connected to a suitable bracket mounted on panel 101. Pawl 287 is arranged to release bell crank 274 by means of solenoid 289, the armature of which is connected to the upper end of pawl 287, said solenoid being attached to a suitable bracket on panel 101. Solenoid 289 is electrically connected to switch $s$ in bank 283 which is actuated by cam S on drum 282. The length of cam S determines the length of the sequencing operation of the machine. When cam S releases its corresponding switch $s$, drum 282 is released by pawl 287 whereupon the sequencing operation stops.

Referring to Figs. 7, 14, 16, 17 and 18, there is shown an electrical control element, generally designated 291, mounted around shaft 108, and rotatable therewith. Element 291 is electrically insulated from shaft 108 by means of an insulating sleeve 292, which provides frictional engagement between itself and element 291, on the one hand, and shaft 108, on the other hand.

Element 291 comprises three spaced apart insulating discs 293, 294 and 295. Between discs 294 and 295 is an electrically conductive disc 296. Between insulating discs 293 and 294 is an insulating disc 297 of reduced diameter, around the periphery of which is mounted an electrical conductive ring 298. Adjacent insulating disc 293 is a mounting disc 299 of insulating material, the periphery of which is bounded by an electrically conductive ring 301. On the face of plate 299 are attached contact element 302 and contacting element 303, that are spaced apart a suitable distance from each other. Contact element 302 is connected by way of lead line 304, extending through plate 299, discs 293, 297 and 294 to conductive disc 296. Contact element 303 is connected by way of lead line 305, extending through plate 299 and through insulating disc 293 to electrically conductive ring 298.

Figure 17:
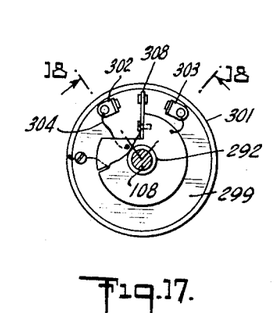
Fig. 17 is a left hand elevational view of Fig. 16.
Figure 18:
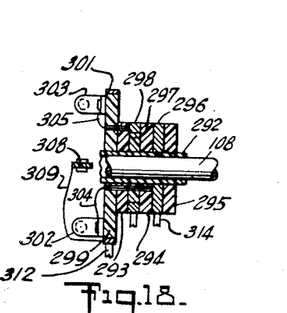
Fig. 18 is a composite cross-section taken on line 18—18 of Fig. 17.

A contact disc 307 is mounted for frictional rotation around shaft 108 and attached to said disc is a radially extending contact arm 308, which is adapted to make contact with either element 302 or 303. Contact arm 308 is electrically connected by way of electrically conductive spring 309 to electrically conductive ring 301. The tension of spring lead 309 is arranged normally to position contact arm 308 substantially midway in a null or non-contacting position between elements 302 and 303. As shaft 108 is rotated in either direction by the rotation of knob 83a, either element 302 or 303 on disc 307 will be contacted by contact arm 308, after which spring lead 309 will cause contact arm 308 to resume its neutral non-contacting position, as shown in Fig. 17.

Attached to bracket 107 is a support bracket 311 (Fig. 14), in which are mounted three electric brushes 312, 313 and 314, each of which are movable longitudinally in suitable slots in bracket 311, and which are spring loaded in such apertures by means of electrical conductive springs 315, 316 and 317, respectively, which have terminals 318, 319 and 320, respectively, on the outside of bracket 311. Brushes 312, 313 and 314 are adapted to continuously wipe electrically conductive ring 301, ring 298 and disc 296, respectively. Terminals 318, 319 and 320 are connected to a stepping switch 321 (Fig. 5), mounted inside the camera on partition 41.

It is apparent that the rotation of shaft 108 in one direction or the other will cause one or the other of ring 298 or disc 296 to be actuated momentarily, thereby communicating a single instruction to stepping switch 321, depending upon whether masking plate 114 is raised or lowered, as will be described in greater detail hereinbelow.

Figure 2:
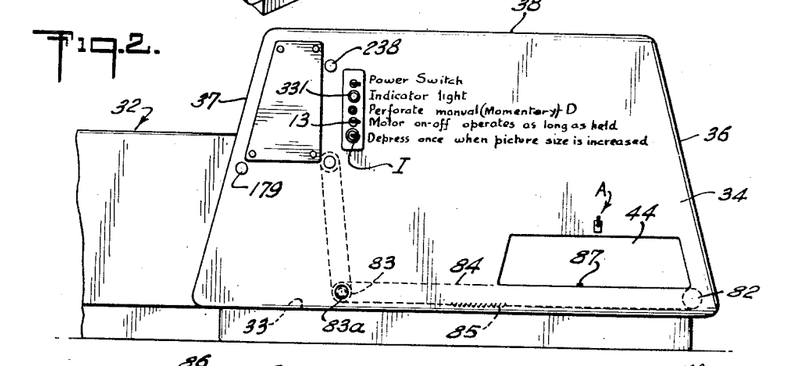
Fig. 2 is an enlarged elevation of the opposite operating side of the camera showing a switch panel as well as a phantom outline of the adjustment mechanism.
Figure 22:
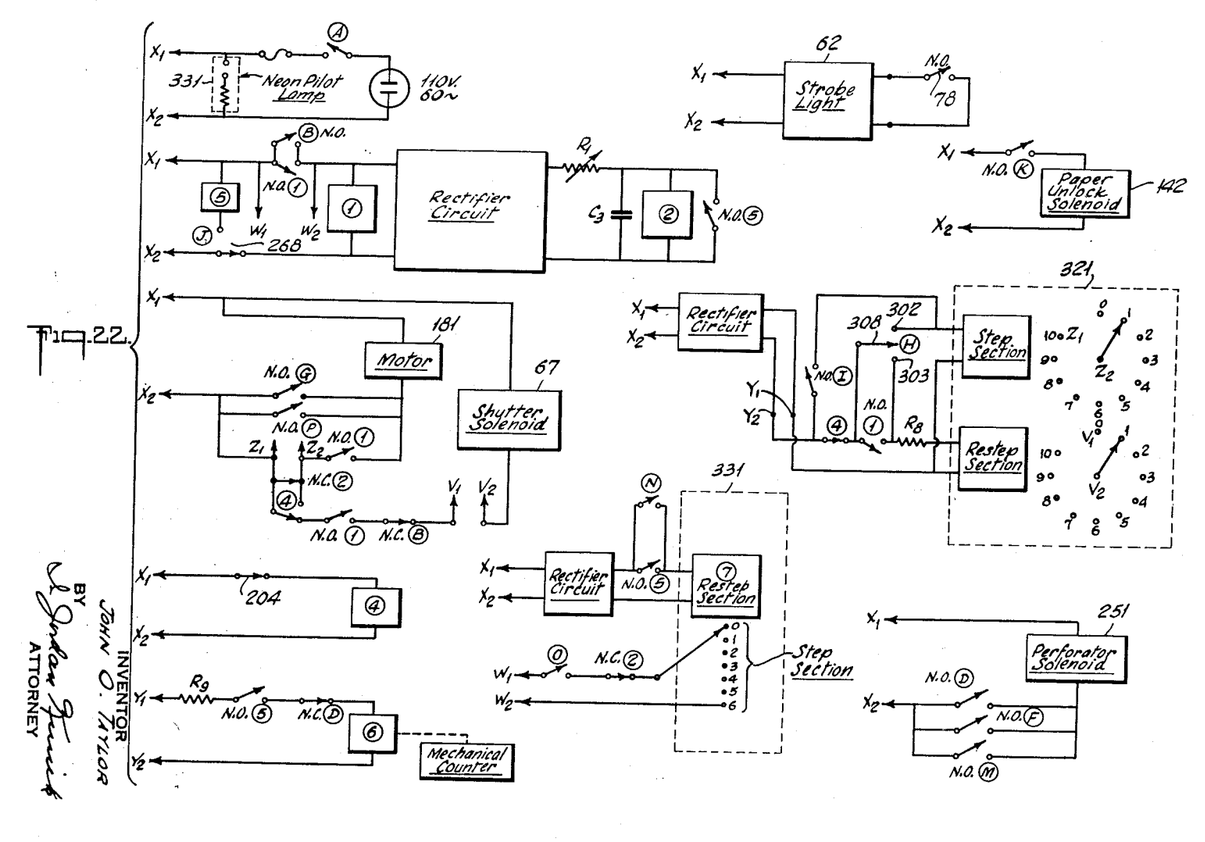
Fig. 22 is a schematic circuit diagram of the various electrical components for controlling the operation of the camera.

The electrical circuit for operation of the copying camera is shown schematically in Fig. 22, wherein the various relays and their respective switches are given similar numbers and wherein the switches are designated as N. O. (normally open), or N. C. (normally closed). Power is derived from a suitable source, such as 110 volt and 60 cycle current, as indicated, one lead from said source containing a normally operated master power switch A and a fuse. A neon pilot lamp 331, in series with a suitable resistor is connected across the power lead lines to indicate when master switch A has been turned on. Both master switch A and pilot lamp 331 are positioned on wall 34 of the camera (Fig. 2).

The lead lines from the power source have a pair of terminals X1 and X2, which are connectible through suitable terminal blocks 332 and 333 (Fig. 5) to the corresponding terminals, designated X1 and X2 of the other portions of the circuit, as indicated.

The operation of the camera herein will now be described by reference to the elements in the schematic circuit in conjunction with the operative mechanical parts described hereinabove.

As a starting point, it first may be assumed that copy 49 has been placed upon table 48, and pointer 87 has been moved to a position measuring off the size of said copy, thereby automatically causing masking plate 114 to frame film 121 for the exposure to be taken, and that an exposure has just been taken on film 121.

Control switch 204 on masking plate 114, operative through notch 211 (Figs. 15, 33), has closed its circuit against conductor strip 202, thereby energizing relay 4 and maintaining contacts 4 in their positions. A time delay relay 2 is connected to the power source by way of a rectifier circuit and of a time delay circuit comprising variable resistor R and condenser C. Relay 2 is in its deenergized state whereby its contacts in the motor circuit are closed, as shown.

To begin the photographing cycle, the operator presses momentary normally open start switch B (also Fig. 2), and then releases it. By this action, relay 1 seals itself in through its own normally open contacts, whereby motor 181 starts running and power is now applied to the circuit of relay 2. Condenser C in the time delay circuit prevents relay 2 from energizing immediately.

During this delay period, motor 181 has caused film 121 to move from its previous rest position, such that control switch 204 is caused to open by the downward movement of notch 211, the body of film 121 being interposed between pin 204 and conductive strip 202. The opening of control switch 204 causes the contacts of relay 4, in circuit with said switch, to change, and soon after this, relay 2 energizes and places motor 181 under the sole control of switch 204. See circuit of motor 181.

Motor 181 continues to run, pulling film 121 downward until the next notch 211 permits switch 204 to close again. When this occurs, relay 4 is activated to cause contact 4 in the motor circuit to open, thereby stopping the running of motor 181, and consequently stopping the movement of film 121. At the same time, the same contact 4 closes the circuit of shutter solenoid 67, thereby opening shutter 66. At the end of the shutter stroke, as indicated in connection with the description of Fig. 6, microswitch 78 trips, firing strobe light 62, illuminating copy 49 and exposing film 121 which is framed by paper guide 115 and surface 215 of block 214. After the exposure, shutter 66 closes under the action of spring 76. At the same time, or very soon thereafter, momentary microswitch F, in the circuit of perforating solenoid 25, trips, thereby causing perforator solenoid 251 to be actuated to provide film 121 with a perforating line 228, as well as with notches 211, knife 219 being retracted under the action of springs 255, as described hereinabove in connection with Fig. 9.

Microswitch F is positioned in tandem with microswitch 78, and is operated simultaneously or slightly after switch 78 is operated by lever 71.

At the end of the stroke of perforating knife 219, microswitch 268 is tripped (Fig. 9), thereby opening the circuit to relay 1 (Fig. 22), and simultaneously energizing relay 5, the contacts of relay 5 being utilized for counting and for automatic operation, as will be described hereinbelow. At the same time, the condenser in the time delay circuit for relay 2 is shortcircuited. When relay 1 opens, its contacts open to break the power to the circuit of motor 181.

To prevent re-cycling, a set of normally closed contacts of start switch B is placed in series with shutter solenoid 67. Thus, if the operator presses switch B and holds it, motor 181 will start and run normally until the next notch 211 registers with switch 204, at which time the motor will stop and there will be no further action until switch B is released.

It will be understood, of course, that in order for this cycle to have begun, film 121 must have been perforated at least once to act as a guide for switch 204. Hence, when film 121 is moved downward between paper guide 157 and masking plate 114, it must be provided with an initial pair of control notches 211. This may be accomplished by manually operating momentary switch D in the circuit of perforator solenoid 251, switch D being mounted on wall 34 of the camera (Fig. 2).

After a sequence of pictures of a particular piece of copy work has been exposed and before perforator solenoid 251 is actuated again, the operator turns knob 238 to lift bar 234 to cause the assembly that carries cutting knife 219 to drive home to the film severing position, whereby film 121 is cut completely, and the strip of exposures may be fed to the developing tank, as described hereinabove.

After taking a series of exposures of a particular piece of copy, it is often desired to preserve the film strip and continue to take exposures of another piece of copy whose size is different from that of the previous copy. If the subsequent picture size is smaller than the previous size then no electrical changes are required.

In enlarging the picture size, however, masking plate is lowered and in many cases control switch 204 will be required to skip one or more notches 211 in its path. Referring to Figs. 19, 20 and 21, let it be assumed that there has been taken a series of exposures a, b, c, d, e, having a length of two inches, for example, in respect of the longitudinal dimension of film 121. In Fig. 19, the last exposure e has just been made and now a larger piece of copy work must be photographed, thereby requiring a larger exposure of four inches. Hence, when the new copy work is measured off by the operator manipulating pointer 87, masking plate 114 is automatically lowered to a new position to frame the new exposure, as shown in Figure 20. If no precaution were to be taken, and film 121 proceeded in its downward path, notch 211 between exposure d and e would register with control switch 204. As described hereinabove, film 121 would then be stopped and if this were permitted, there would result a double exposure in the area of the film occupied by exposure e.

It is necessary, therefore, that film 121 pass downward and not be interrupted, despite the movement of notch 211 between exposure d and e past control switch 204, until notch 211 at the top of exposure e reaches the position shown in Fig. 21, at which time said switch may become operative to initiate the sequence of operations described above.

In order to accomplish the foregoing, a stepping switch 321 is provided (Fig. 22), whose input terminals Y1 and Y2 are connected by way of a rectifier circuit to terminals X1 and X2, said rectifier circuit providing direct current for the stepping switch. Stepping switch 321 comprises a step section having a bank of positions 0, 1, 2, 3, 4, . . . , and a restep section having a bank of positions 0, 1, 2, 3, 4. . . . Although the illustration shows ten positions in the step and restep sections, it is to be understood that any number of positions that may be necessary can be provided within practicable limits.

Terminals Z1 and Z2 of the step section of switch 321 are connected to terminals Z1 and Z2, respectively, in the circuit of motor 181 which it controls. When the arm of the step section is in circuit with any of positions 1, 2, 3, 4, . . . , motor 181 may continue running. When the arm is in the 0 (zero) position, motor 181 is permitted to stop.

Terminals V1 and V2 of the restep section of switch 321 are connected to terminals V1 and V2 in the circuit of shutter solenoid 67. The restep section performs the function of preventing the activation of shutter solenoid 67 each time control switch 204 closes through a notch 211 passing it by. This is accomplished by reason of the fact that the circuit to shutter solenoid 67 is completed through terminals V1 and V2 only when the stepping switch is in the zero position. As shown in the circuit diagram of stepping switch 321, both step and restep sections are mechanically connected to each other to register at similar numbered positions.

Connected between the step and restep sections of switch 321 is an electrical representation of the "up-down" switch shown in Fig. 17. Also connected between said sections is a normally open momentary switch I physically located on wall 34 of the camera.

Assuming that an exposure has just been made, that stepping switch 321 is in its 0 (zero) condition, and that the operator wants to make another exposure of identical size, when relay 1 is energized and switch 4 is closed, the only effect upon the stepping switch is the energization of the restep section. Since the latter is in its 0 position where it is mechanically limited, and cannot restep further, it takes no part in the operating cycle of the camera.

If the exposure size is to be reduced, the raising of masking plate 114 causes control element 291 (Fig. 14) to rotate, whereby "up" contact 303 is brought into contact with arm 308, and when switches 1 and 4 are closed, the restep section of switch 321 is energized, no effect being produced since the latter has been at its 0 position.

In the event it is desired to enlarge the exposure size in accordance with new copy matter and it is necessary that one notch 211 pass by control switch 204 without the latter initiating an exposure cycle (Figs. 20 and 21), it is required to change the condition of stepping switch whereby its step and restep sections are placed in position 2. Hence, as film 121 moves downward and notch 211 exposures d and e moves past switch 204, stepping switch will change from position 2 to position 1. When notch 211 at the top of exposure e reaches control switch 204 (Fig. 21), stepping switch will change from position 1 to position 0, at which time control switch 204 will now be permitted to initiate the exposure cycle.

In the event two notches 211 in succession are to be bypassed through control switch 204, stepping switch 321 would have to be set at position 3, and so on. It is apparent, then, that stepping switch 321 must be preset to a position numerically one greater than the number of notches 211 in succession bypassing control switch 204.

When masking plate 114 has moved downward and element 291 has rotated to cause down contact 302 to close with arm 308, film 121 moves down and notches 211 permit control switch 204 to close. Each resultant electrical pulse from the closing of switch 204 causes stepping switch to move from its initial 0 position to the position equal to the number of notches that have been bypassed. The extra required step is imposed upon the stepping switch by manually depressing normally open switch I. When this presetting procedure is completed, and the exposure cycle started again, stepping switch 321 will reset automatically by means of the action of switches 1 and 4, whose functions have been described above.

As indicated above, when it is desired to sever a sequence of exposures from the supply reel of film 121, knob 238 is rotated whereby solenoid 254 causes knife 219 to move into the film cutting position. At the same time, bell crank 274 has been rotated to cause sequencing drum 282 to move into position where it is rotated by means of its resilient drive wheel 283 being engaged by drive wheel 284 mounted on continuously rotating driven shaft 126. Cam K on drum 282 is adapted to close switch k, connected to solenoid 142, which causes rolls 128 and 129 to be lifted upwards releasing their grip upon film 121, which is now prevented from being drawn from its supply reel 122.

After the severed strip of film 121 has dropped into the bottom of dark chamber 43, the camera is ready to receive another supply of film. The end of cam K has permitted switch k to open, thereby releasing solenoid 142, permitting rolls 128 and 129 to descend upon drive rolls 124 and 125 to grip film 121. Film 121 is now ready to be fed again toward the exposure position.

As film 121 moves downward toward masking plate 114, it is desirable to provide a control notch 211 near the lead edge of the film as it passes punches 223. Therefore, cam M of drum 282 comes into play to close switch m which is connected into the same circuit with the perforating solenoid 251 to energize the latter to cause the control notch 211 to be formed in the film.

Cam P on drum 282 is arranged to close normally open switch p in order to keep motor 181 running, and cam P is arranged to terminate its action slightly before the energization of perforating solenoid 251 by cam M, so that the motor can be stopped during the notching process. After this, the operator can insert new copy matter into the camera, make the requisite adjustment and start the exposure cycle, as described hereinabove.

Provision may be made for operating the camera to produce a predetermined number of exposures of a particular piece of copy automatically. For this purpose there is provided a second stepping switch 331 having a step section and a restep section, as shown in Fig. 22. Stepping switch 331 is connected by way of a rectifier circuit to terminals X1 and X2 of the power supply, and has a suitable number of positions, as may be required. The step section of the switch is connected to terminals W1 and W2 in the circuit of relays 1 and 2.

Assuming that the circuit is at rest, the operator may set stepping switch 331 to the position indicating the desired number of copies, a suitable manually controlled knob (not shown) being provided for that purpose. Switch 0 in the circuit of the step section of stepping switch 331 is then closed by the operator. The switch designated N. C. 2 in the circuit of stepping switch 331 is closed, and hence a short circuit appears across points W1 and W2, thereby producing a condition equivalent to the condition imposed by the operator closing switch N. O. B. Relay 1 becomes energized, closing points W1 and W2 by means of N. O. switch 1. At this instant, points W1 and W2 are doubly shorted and a short time later relay 2 is energized, opening N. C. switch 2 in the circuit of stepping switch 331. Continuity is still maintained across W1 and W2, however, by the action of the closed contact of relay 1.

The exposure sequence has been initiated and the actions of motor 181, shutter solenoid 67, strobe light 62, and perforator solenoid 251 are performed as described hereinabove.

At the end of the cycle, when switch J is actuated by the motion of the perforator assembly, the circuit is broken to relay 1, and points W1 and W2 become open. Additionally, the action of switch J energizes relay 5, whose contacts close, thereby causing stepping switch 331 to restep once. Also, a contact of relay 5 shorts the capacitor C in the time delay circuit of relay 2, permitting the latter to deenergize. At this point, the automatic cycle repeats, since once again N. C. switch 2 in the circuit of switch 331 imposes a short across points W1 and W2. Thus, successive exposure sequences are run off until stepping switch 331 reaches the zero position, at which time its automatic control ends.

In the specification, I have explained the principles of my invention, and the best mode in which I have contemplated applying those principles, so as to distinguish my invention from other inventions; and I have particularly pointed out and distinctly claimed the part, mode or combination which I claim as my invention or discovery.

While I have shown and described certain preferred embodiments of my invention, it will be understood that modifications and changes may be made without departing from the function and scope thereof, as will be clear to those skilled in the art.

I claim:

1. A copying camera comprising a strip of photosensitive film, means for transporting said film past an exposure area, a lens, a shutter for said lens, illuminating means, a masking element movable in said exposure area to determine the size of the exposure, means for mounting the copy to be photographed, movable means for measuring the size of the copy, said measuring means being connected to and adapted to move said masking element to delimit the exposure area in a predetermined ratio to copy size, a control switch mounted on said element and electrically connected to said transport means, said switch being in the path of said film, means for producing notches in said film which are adapted to move past said switch to permit the latter to close whereby the movement of said film is stopped, means connecting said switch to said shutter whereby the latter opens when said switch closes, means connecting said switch with said illuminating means whereby the latter is fired after the opening of the shutter to expose the film, and means connected with said switch to produce a subsequent notch after an exposure has been taken on said film.

2. A copying camera comprising a strip of photosensitive film, means for transporting said film past an exposure area, a lens, a shutter for said lens, illuminating means, a masking element movable in said exposure area to determine the size of the exposure, means for mounting the copy to be photographed, movable means for measuring the size of the copy, said measuring means being connected to and adapted to move said masking element to delimit the exposure area in a predetermined ratio to copy size, a switch mounted on said element and electrically connected to said transport means, said switch being in the path of said film, means for producing notches in said film which are adapted to move past said switch to permit the latter to close whereby the movement of said film is stopped, means connecting said switch to said shutter whereby the latter opens when said switch closes, means connecting said switch with said illuminating means whereby the latter is fired after the opening of the shutter to expose the film, means connected with said switch to produce a subsequent notch after an exposure has been taken on said film, and means connected with said switch to produce a perforation line in said film when said notching means is actuated.

3. A copying camera comprising a strip of photosensitive film, means for transporting said film past an exposure area, a lens, a shutter for said lens, illuminating means, a masking element movable in said exposure area to determine the size of the exposure, means for mounting the copy to be photographed, movable means for measuring the size of the copy, said measuring means being connected to and adapted to move said masking element to delimit the exposure area in a predetermined ratio to copy size, a switch mounted on said element and electrically connected to said transport means, said switch being in the path of said film, means for producing notches in said film which are adapted to move past said switch to permit the latter to close whereby the movement of said film is stopped, means connecting said switch to said shutter whereby the latter opens when said switch closes, means connecting said switch with said illuminating means whereby the latter is fired after the opening of the shutter to expose the film, means connected with said switch to produce a subsequent notch after an exposure has been taken on said film, means connected with said switch to produce a perforation line in said film when said notching means is actuated, and a stepping switch connected to the first mentioned switch and adapted to de-activate said first mentioned switch when said masking element is moved to enlarge the exposure area to produce a new series of exposures larger than the previous series and whereby it is required to cause said first mentioned switch to be inoperative while passing any notch in the strip of film, at least part of which has previously been exposed.

4. A copying camera according to claim 3 wherein the circuit of said stepping switch includes a switch operable by said masking element when the latter is moved to enlarge the exposure area, and a manually operated switch adapted to be actuated a number of times equal to the number of notches to be bypassed by said first mentioned switch in order to cause said stepping switch to de-activate said first mentioned switch the requisite number of times.

5. A copying camera comprising a strip of photosensitive film, means for transporting said film past an exposure area, a lens, a shutter for said lens, illuminating means, a masking element movable in said exposure area to determine the size of the exposure, means for mounting the copy to be photographed, movable means for measuring the size of the copy, said measuring means being connected to and adapted to move said masking element to delimit the exposure area in a predetermined ratio to copy size, a switch mounted on said element and electrically connected to said transport means, said switch being in the path of said film, means for producing notches in said film which are adapted to move past said switch to permit the latter to close whereby the movement of said film is stopped, means connecting said switch to said shutter whereby the latter opens when said switch closes, means connecting said switch with said illuminating means whereby the latter is fired after the opening of the shutter to expose the film, means connected with said switch to produce a subsequent notch after an exposure has been taken on said film, means connected with said switch for perforating and severing said film when said notching means is actuated, and movable means adapted selectively in one position to permit the perforating function and in another position to permit the severing function of the perforating and severing means.

6. A copying camera comprising a strip of photosensitive film, means for transporting said film past an exposure area, a lens, a shutter for said lens, illuminating means, a masking element movable in said exposure area to determine the size of the exposure, means for mounting the copy to be photographed, movable means for measuring the size of the copy, said measuring means being connected to and adapted to move said masking element to delimit the exposure area in a predetermined ratio to copy size, a switch mounted on said element and electrically connected to said transport means, said switch being in the path of said film, means for producing notches in said film which are adapted to move past said switch to permit the latter to close whereby the movement of said film is stopped, means connecting said switch to said shutter whereby the latter opens when said switch closes, means connecting said switch with said illuminating means whereby the latter is fired after the opening of the shutter to expose the film, means connected with said switch to produce a subsequent notch after an exposure has been taken on said film, means connected with said switch to produce a perforation line in said film when said notching means is actuated, a motor for operating said transport means, a switch to start said motor, and a switch operated by said perforating means to stop said motor.

7. A copying camera comprising a strip of photosensitive film, a motor, means operated by said motor for transporting said film past an exposure area, a lens, a shutter for said lens, illuminating means, a masking element movable in said exposure area to determine the size of the exposure, means for mounting the copy to be photographed, movable means for measuring the size of the couy, said measuring means being connected to and adapted to move said masking element to delimit the exposure area in a predetermined ratio to copy size, a switch mounted on said element and electrically connected to said motor, said switch being in the path of said film which normally maintains said switch in an open circuit condition, means for producing notches in said film which are adapted to move past said switch to permit the latter to close thereby stopping the motor whereby the movement of the film is interrupted, solenoid means for operating said shutter, said solenoid being electrically connected to said switch whereby said solenoid is caused to open said shutter when said switch closes, switch means operated by said solenoid to fire said illuminating means after the opening of the shutter, switch means connected to said solenoid for operating said notching means after an exposure has been made on the film, and a switch operated by said notching means to open the circuit to said motor.

8. A copying camera comprising a strip of photosensitive film, means for transporting said film past an exposure area, a motor for said transport means, a lens, a shutter for said lens, a solenoid for operating said shutter, illuminating means, a switch for said illuminating means, a masking element movable in said exposure area to determine the size of the exposure, means for mounting the copy to be photographed, movable means for measuring the size of the copy, said measuring means being connected to and adapted to move said masking element to delimit the exposure area in a predetermined ratio to copy size, a control switch mounted on said element, a relay connected to said control switch, a switch operated by said relay adapted alternately to close the circuit of said motor and said shutter solenoid, said control switch being in the path of said film, movable means for producing notches in said film which are adapted to move past said control switch to permit the latter to close, a solenoid for operating said notching means, a linkage between said shutter solenoid and the switch for the illuminating means on the one hand and the notching solenoid on the other hand, the closing of said control switch being adapted to stop the motor whereby the motion of the film is stopped and to actuate the shutter solenoid to open the shutter, the latter operation causing said linkage to close the switch for the illuminating means and causing the switch for the notching means to be actuated, a momentary start switch connectible to a source of power, a relay hold-down switch connected between said momentary start switch and said control switch, and a stop switch in the circuit of the hold-down relay and operated by said notching means to open the circuit to said hold-down switch.

9. A copying camera according to claim 8, and further comprising a perforating and severing knife mounted on said notching means and adapted selectively to perforate and sever said film, and movable means adapted selectively in one position to permit the perforating function and in another position to permit the severing function of the perforating and severing knife.

10. A copying camera according to claim 8, and further comprising a stepping switch connected to said control switch and adapted to deactivate said control switch when said masking element is moved to enlarge the exposure area whereby it is required to cause said control switch to be inoperative while passing any notch in the strip of film, at least part of which has previously been exposed, a switch in the circuit of said stepping switch operable by said masking element when the latter is moved to enlarge the exposure area, and a manually operated switch adapted to be actuated a number of times equal to the number of notches to be bypassed by said control switch in order to cause said stepping switch to deactivate said control switch the requisite number of times.

11. A copying camera according to claim 8, and further comprising a second stepping switch connectible to said power source, manually operated means for preselecting the number of switching operations to be performed by said second stepping switch, said second stepping switch being connected to said momentary start switch whereby a predetermined number of exposure, notching and perforating cycles will be run off in sequence under control of said second stepping switch.

References Cited in the file of this patent

UNITED STATES PATENTS

| | | |
|---|---|---|
| 2,034,441 | Petit | Mar. 17, 1936 |
| 2,574,392 | Huebner | Nov. 6, 1951 |
| 2,682,817 | Gross | July 6, 1954 |